US007893362B2

(12) United States Patent
Feng et al.

(10) Patent No.: US 7,893,362 B2
(45) Date of Patent: Feb. 22, 2011

(54) SMOKE-RESISTANT SURFACE MOUNT BOX FOR PLENUM SPACE

(75) Inventors: Daan Feng, Richardson, TX (US); John May, Omaha, NE (US)

(73) Assignee: Commscope, Inc. of North Carolina, Hickory, NC (US)

( * ) Notice: Subject to any disclaimer, the term of this patent is extended or adjusted under 35 U.S.C. 154(b) by 282 days.

(21) Appl. No.: 11/764,479

(22) Filed: Jun. 18, 2007

(65) Prior Publication Data

US 2008/0003871 A1 Jan. 3, 2008

Related U.S. Application Data

(60) Provisional application No. 60/819,920, filed on Jun. 28, 2006.

(51) Int. Cl.
*H02G 3/08* (2006.01)
*H01R 13/73* (2006.01)

(52) U.S. Cl. ......................... 174/480; 174/481; 174/50; 174/53; 220/3.2; 220/3.3; 439/535; 439/571

(58) Field of Classification Search ................. 174/480, 174/481, 50, 53, 57, 58, 59, 503, 502; 220/3.2–3.9, 220/4.02; 248/906; 439/535, 536, 571
See application file for complete search history.

(56) References Cited

U.S. PATENT DOCUMENTS

| | | | | | |
|---|---|---|---|---|---|
| 2,620,081 | A | * | 12/1952 | Lear, Jr. | 220/3.8 |
| 4,370,516 | A | * | 1/1983 | Bailey et al. | 174/481 |
| 4,797,507 | A | * | 1/1989 | Lofving | 174/503 |
| 5,276,279 | A | * | 1/1994 | Brownlie et al. | 174/50 |
| 5,486,650 | A | * | 1/1996 | Yetter | 174/53 |
| 5,645,449 | A | * | 7/1997 | Sabo | 439/536 |
| 5,741,158 | A | * | 4/1998 | Reed et al. | 439/536 |
| 5,770,817 | A | * | 6/1998 | Lo | 174/57 |
| 6,342,675 | B1 | * | 1/2002 | DeBartolo et al. | 174/481 |
| 6,355,880 | B1 | * | 3/2002 | Bateson et al. | 174/502 |
| 6,455,773 | B2 | * | 9/2002 | Bellanger | 174/50 |
| 6,768,055 | B1 | * | 7/2004 | Gorin | 174/50 |
| 7,105,743 | B2 | * | 9/2006 | Caveney | 174/50 |

* cited by examiner

*Primary Examiner*—Angel R Estrada
(74) *Attorney, Agent, or Firm*—Myers Bigel Sibley & Sajovec

(57) ABSTRACT

A plenum-rated surface mount box includes a main panel and a pair of side walls attached to opposite ends of the main panel. At least one of the side walls includes a recess configured to receive a connector adapter. The main panel and side walls are formed as a unitary structure and comprise a polymeric material. This configuration can simplify manufacture, installation of the box on a wall or to an existing electrical box, and/or installation of cables and adapters.

10 Claims, 9 Drawing Sheets

SMOKE-RESISTANT SURFACE MOUNT BOX FOR PLENUM SPACE

RELATED APPLICATION

This application claims priority from U.S. Provisional Patent Application No. 60/819,020, filed Jun. 28, 2006 and entitled Smoke-Resistant Surface Mount Box for Plenum Space, the disclosure of which is hereby incorporated herein in its entirety.

BACKGROUND OF THE INVENTION

According to the National Electric Code (NEC), a plenum is a "compartment or chamber to which one or more air ducts are connected and [which] forms part of the air distribution system." The concern is that during a fire, if there is burning material in a plenum air space, smoke and fumes can travel through air ducts to the whole building. For this reason, there are codes to restrict the types of materials (such as wiring) that can be placed in the plenum.

Currently, communications connections made in plenum space are often made via a surface mount box. A surface mount box is an open sided box that is mounted on the floor, walls or ceiling of a plenum space. The surface mount box is typically hollow and includes ports for establishing connections between communications cables, conductors and the like. The open end of the box is mounted to a surface such that the walls of the box protect the connections contained inside.

Surface mount boxes are regulated by UL 2043, which governs heat release and smoke of a box that catches fire. To date, boxes rated for plenum space have been formed of metal in order to pass UL 2043. However, the metal surface mount boxes can be rather expensive to manufacture and can render installation of the boxes and connection of cables difficult.

SUMMARY OF THE INVENTION

As a first aspect, embodiments of the present invention are directed to a plenum-rated surface mount box. The box comprises a main panel and a pair of side walls attached to opposite ends of the main panel. At least one of the side walls includes a recess configured to receive a connector adapter. The main panel and side walls are formed as a unitary structure and comprise a polymeric material. This configuration can simplify manufacture, installation of the box on a wall or to an existing electrical box, and/or installation of cables and adapters.

As a second aspect, embodiments of the present invention are directed to a plenum-rated surface mount box, comprising a main panel having a plurality of apertures sized and configured to receive communications cables and a pair of side walls attached to opposite ends of the main panel. At least one of the side walls includes a recess configured to receive a connector adapter. The main panel and side walls are formed as a unitary structure and comprise a polymeric material selected from the group consisting of: polyetherimide, polysulfone, fluoropolymers, vinyl polymers, and non-halogenated polymers. The polymeric material and the nominal wall thickness of the main panel and side walls are selected such that the surface mount box satisfies the test requirements of UL 2043.

DETAILED DESCRIPTION OF EMBODIMENTS OF THE INVENTION

Figure 1:
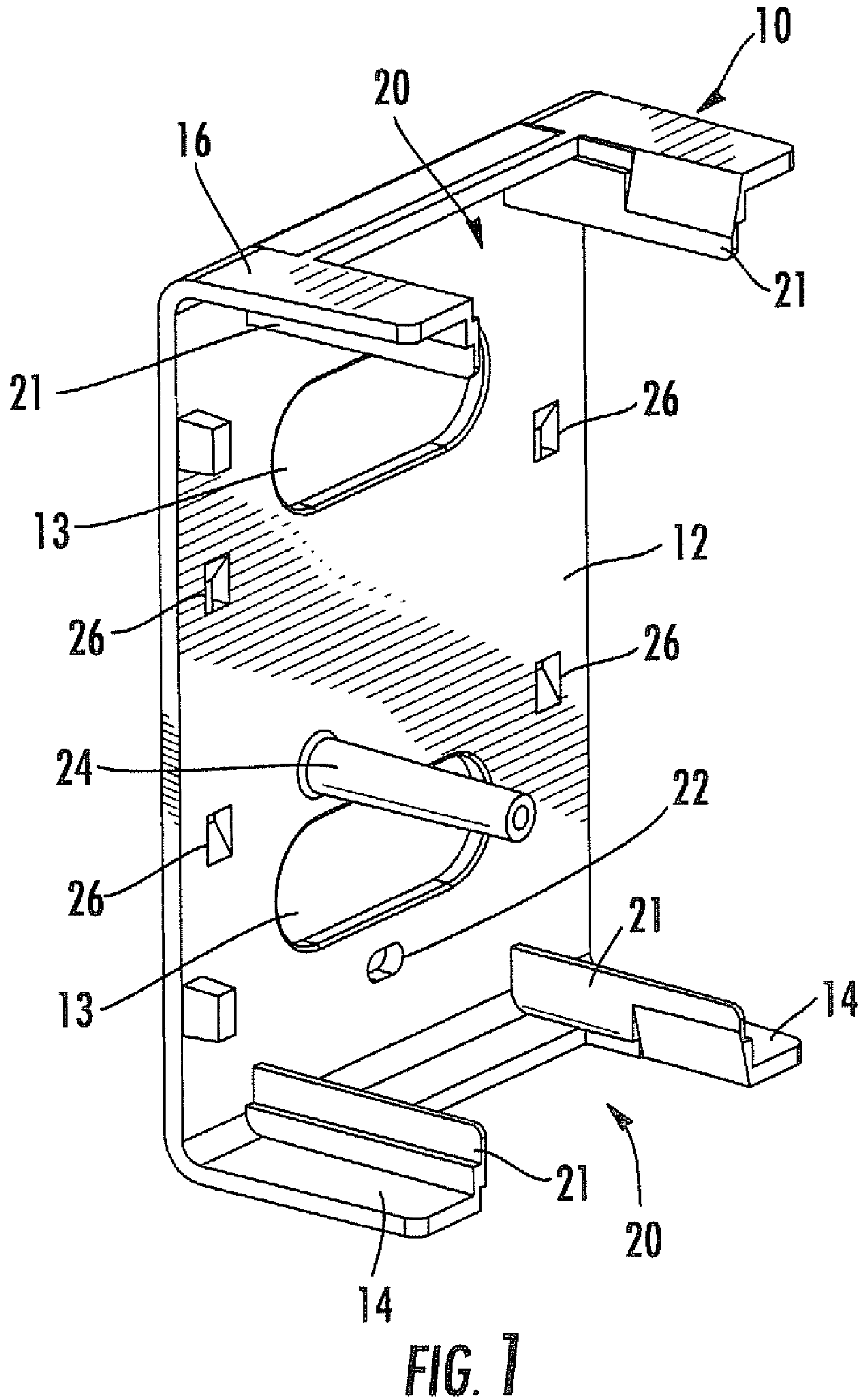
FIG. 1 is a perspective view of a surface mount box according to embodiments of the present invention.

The present invention will now be described more fully hereinafter, in which preferred embodiments of the invention are shown. This invention may, however, be embodied in different forms and should not be construed as limited to the embodiments set forth herein. Rather, these embodiments are provided so that this disclosure will be thorough and complete, tin and will fully convey the scope of the invention to those skilled in the art. In the drawings, like numbers refer to like elements throughout. Thicknesses and dimensions of some components may be exaggerated for clarity.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein the expression "and/or" includes any and all combinations of one or more of the associated listed items.

In addition, spatially relative terms, such as "under", "below", "lower", "over", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "under" or "beneath" other elements or features would then be oriented "over" the other elements or features. Thus, the exemplary term “under” can encompass both an orientation of over and under. The device may be otherwise oriented (rotated 90 degrees or at other orientations) and the spatially relative descriptors used herein interpreted accordingly.

Well-known functions or constructions may not be described in detail for brevity and/or clarity.

Figure 2:
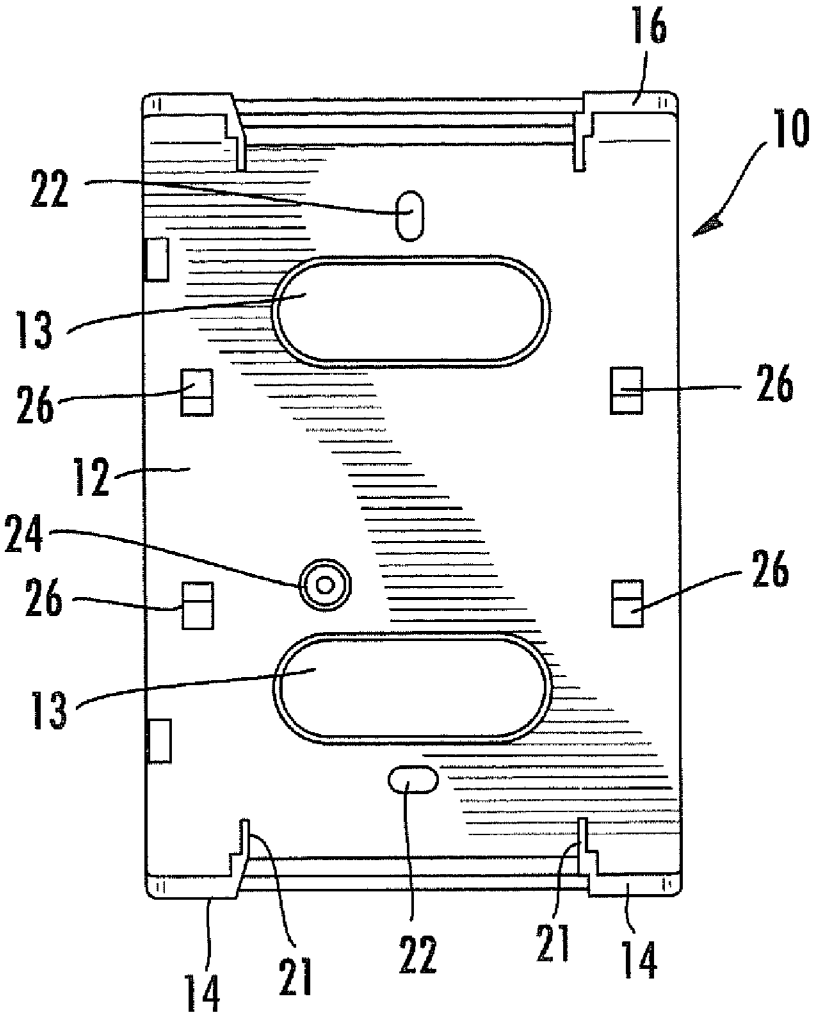
FIG. 2 is a top view of the surface mount box of FIG. 1.
Figure 3:
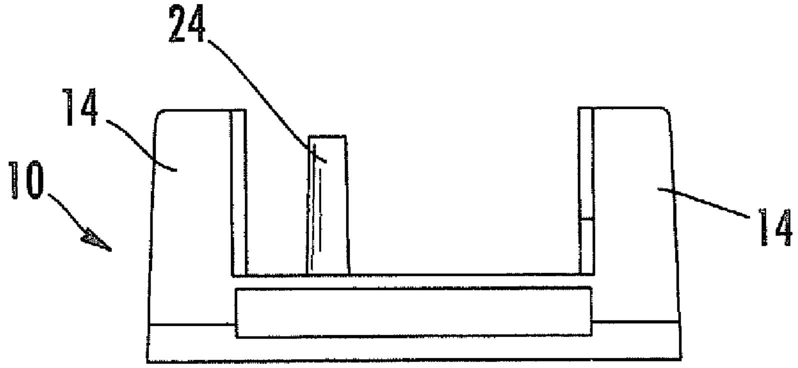
FIG. 3 is an end view of the surface mount box of FIG. 1.

FIGS. 1-3 illustrate a surface mount box, designated broadly at 10, according to embodiments of the present invention. The surface mount box 10 includes a main plate 12 having two oblong cable entry apertures 13. A sidewall 14 merges with and extends generally perpendicular to one end of the main plate 12. The sidewall 14 includes an adapter recess 20 that is lined on either side by flanges 21. A second sidewall 16 with an adapter recess 20 merges with and extends generally perpendicular to the opposite end of the main plate 12; in some embodiments, the sidewall 16 is solid and has no adapter recess. The main plate 12 also includes two mounting apertures 22. A post 24 extends generally normal to the main plate 12 near one of the cable entry apertures 13. Several holes 26 are positioned in various locations along the side edges of the main plate 12.

In the illustrated embodiment, the surface mount box 10 is formed of a thermoplastic material. More particularly, the box 10 is formed of a thermoplastic material that is capable of passing the heat release and smoke requirements of UL 2043. Exemplary thermoplastic materials include polyetherimide (PEI), polysulfone (PS), fluoropolymers such as perfluoroalkoxy polymers (PFA), vinyl polymers such as polyvinylchloride (PVC), and non-halogenated polymers such as flame retardant polyolefins. When formed of a polymeric material, typically the wall thickness of the box 10 is between about 0.062 and 0.125 inches. Of course, the thermoplastic material selected should also be able to provide suitable mechanical and electrical properties to the box 10.

When formed of a thermoplastic material such as those listed above, the box 10 can pass the requirements of UL 2043. Also, the box can be formed in an injection molding process, which can simplify manufacturing significantly. Moreover, the box 10 can be formed with features, such as the adapter recess 20, mounting apertures 22, post 24, and holes 26 that can simplify installation of cables to the box and facilitate cable management.

Figure 4:
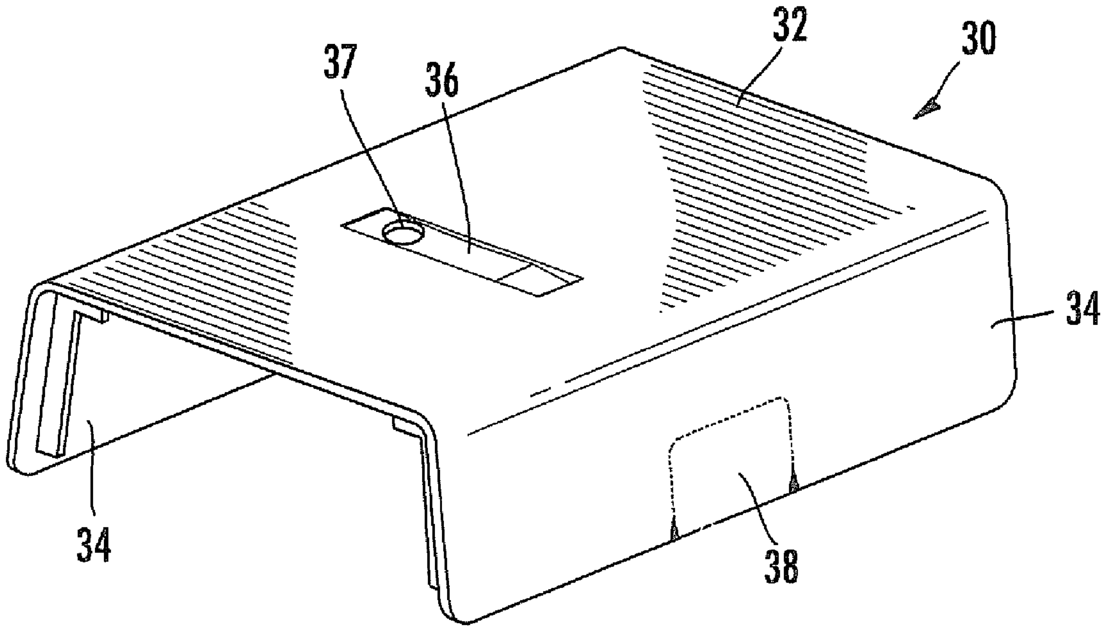
FIG. 4 is a perspective view of a cover for the surface mount box of FIG. 1.
Figure 8:
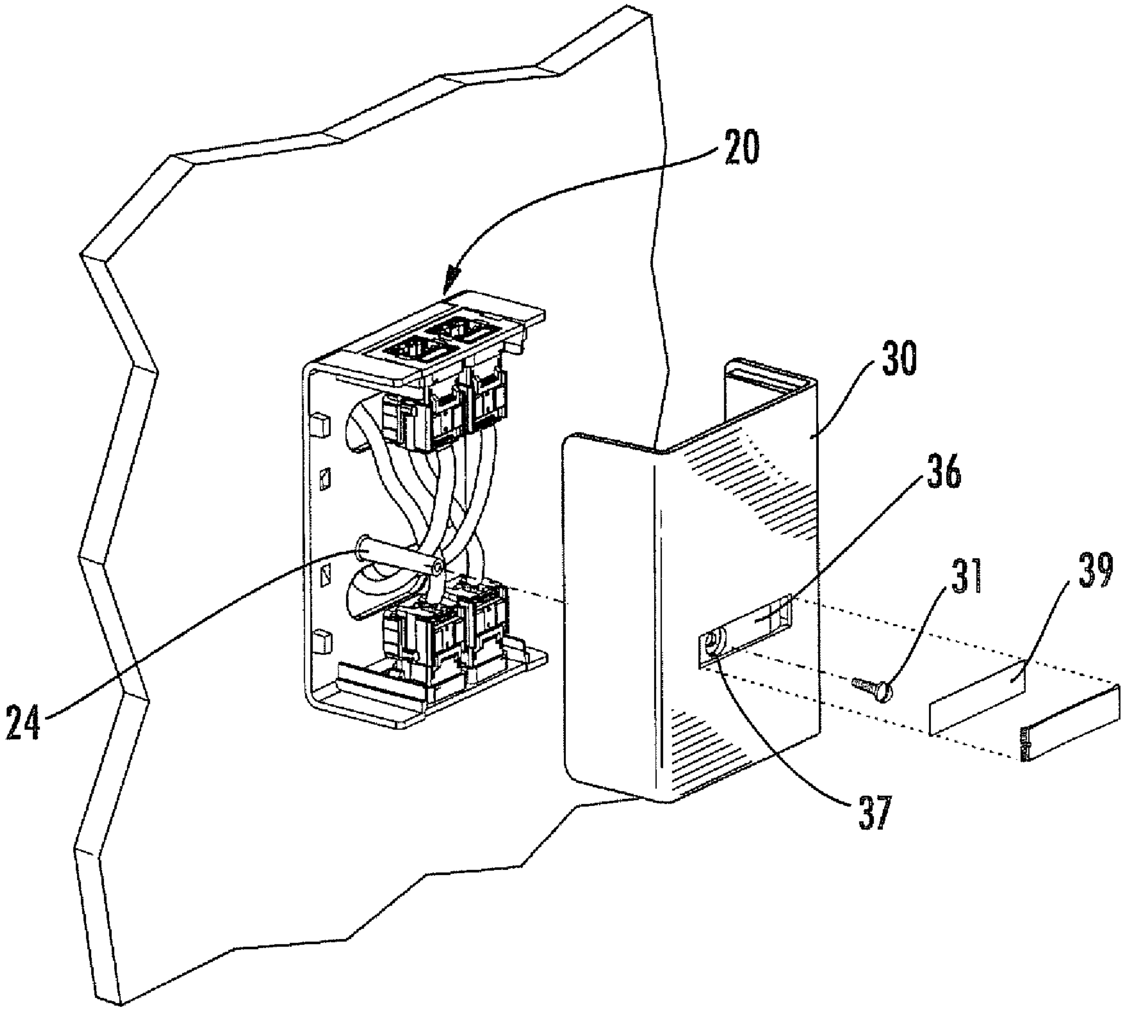
FIG. 8 is a perspective view of the cover of FIG. 4 being installed on the surface mount box of FIG. 7.

Turning now to FIG. 4, a cover 30 for the surface mount box 10 is illustrated therein. The cover 30 includes a main panel 32 and sidewalls 34 that extend from opposite edges of the main panel 32. The main panel 32 also includes a label recess 36 in which a mounting aperture 37 (best seen in FIG. 8) is present. Each of the sidewalls 34 may optionally include one or more frangible sections 38. The cover may be formed of a polyermic material; exemplary polymeric materials include those set forth above for use with the surface mount box 10.

Figure 5:
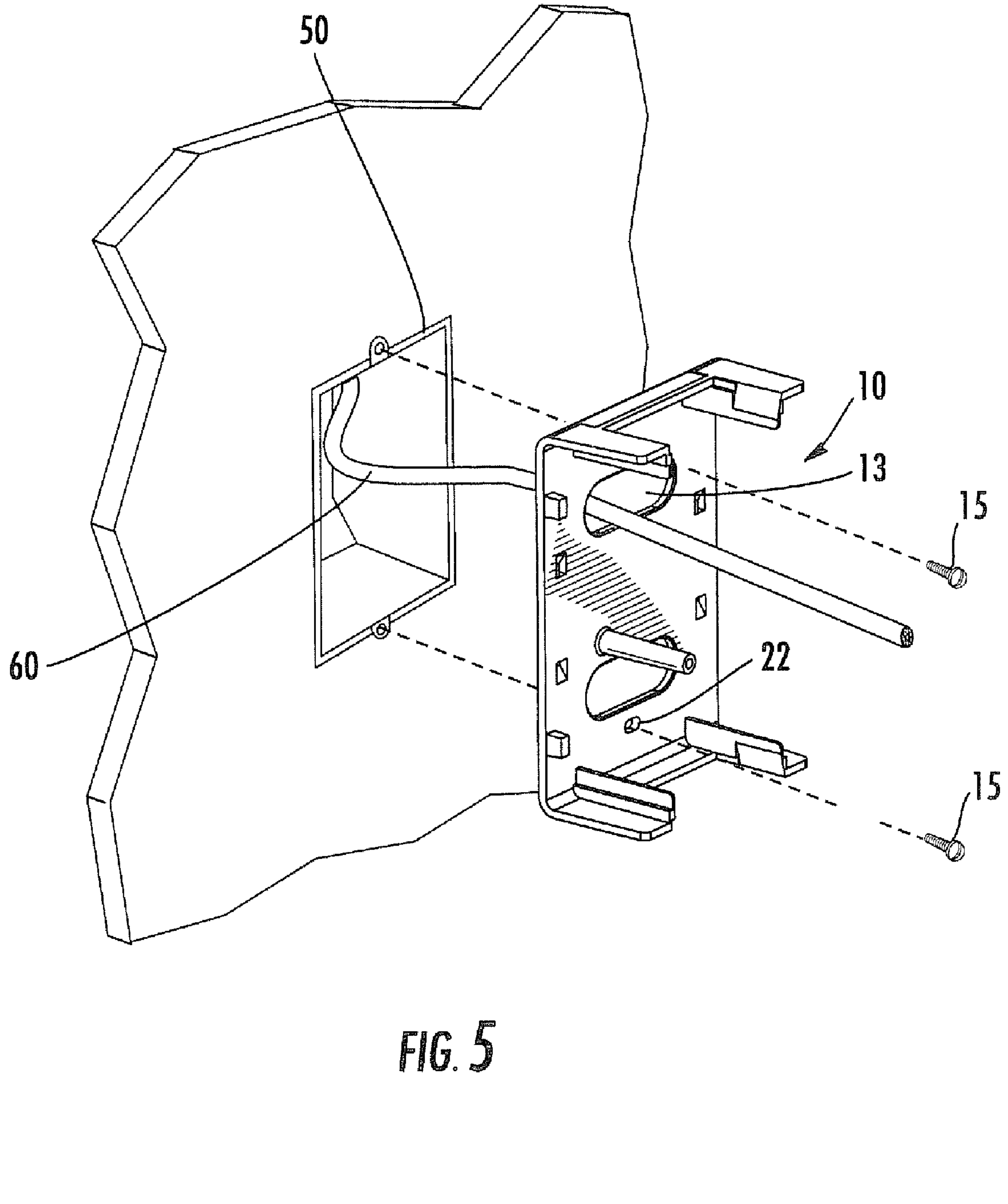
FIG. 5 is an exploded perspective view illustrating the mounting of the surface mount box of FIG. 1 on an existing electrical box.

As can be seen in FIG. 5, the surface mount box 10 may be mounted to an existing electrical box 50 via screws 15 inserted through mounting apertures 22 in holes in the electrical box 50. One or more communications cables 60 can be threaded through the cable entry apertures 22 in the main plate 12.

Figure 6:
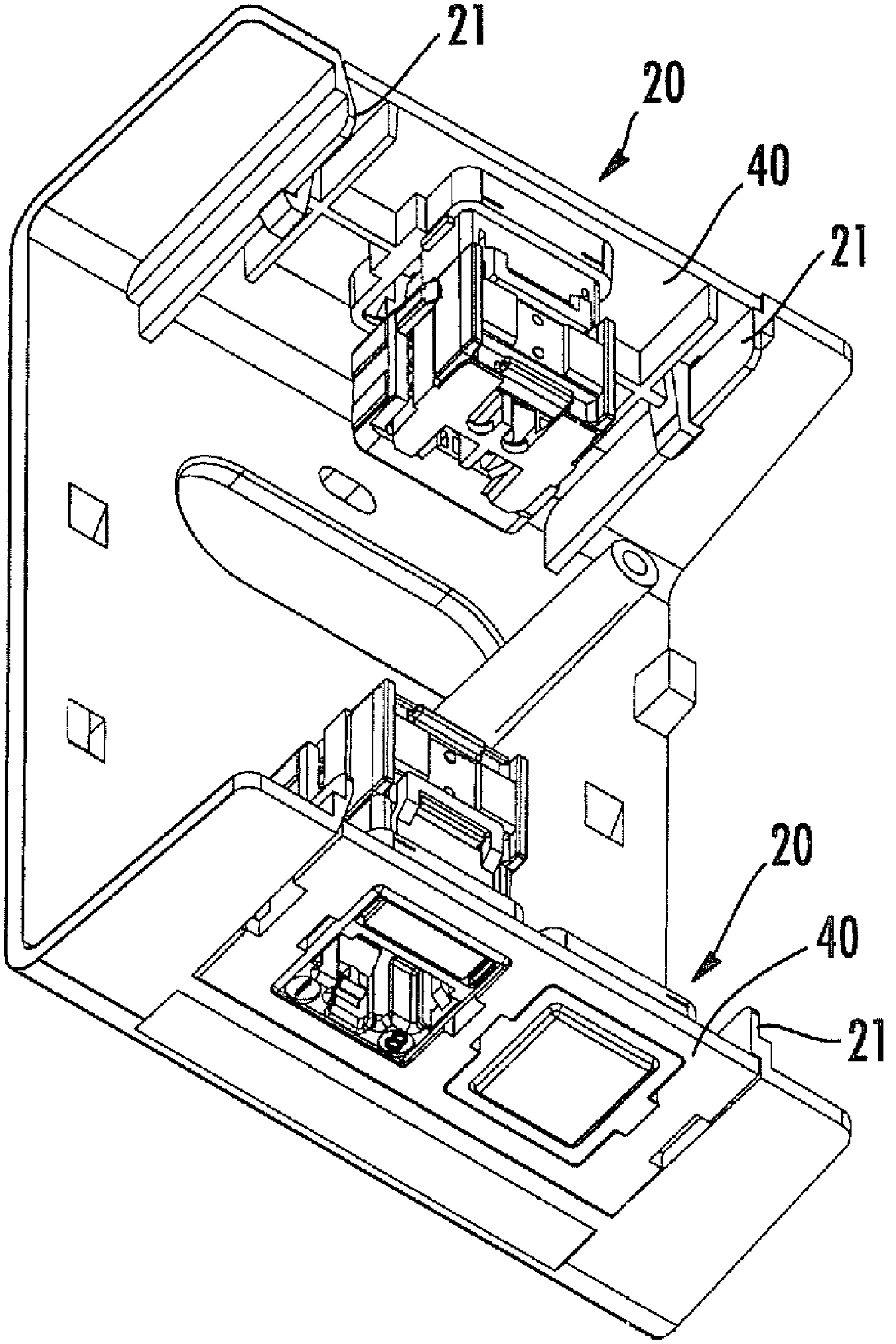
FIG. 6 is a perspective view of the surface mount box of FIG. 1 with adapters inserted into the adapter recesses thereof.

Adapters 40, such as adapters for M-series outlets, can be snapped into respective adapter recesses 20 via snap latches that engage the flanges 21 of the box 10 (see FIG. 6). Adapters may be configured to receive a wide variety of connectors, including LC, ST and SC fiber couplers, VGA, S-Video, Coax, BNC and RCA couplers; the adapters may be simplex (single port), duplex (dual port) or may support a different number of ports. Alternatively, one of the adapter recesses 20 may be filled with a dust plate if connections are not desired in a particular location.

Figure 7:
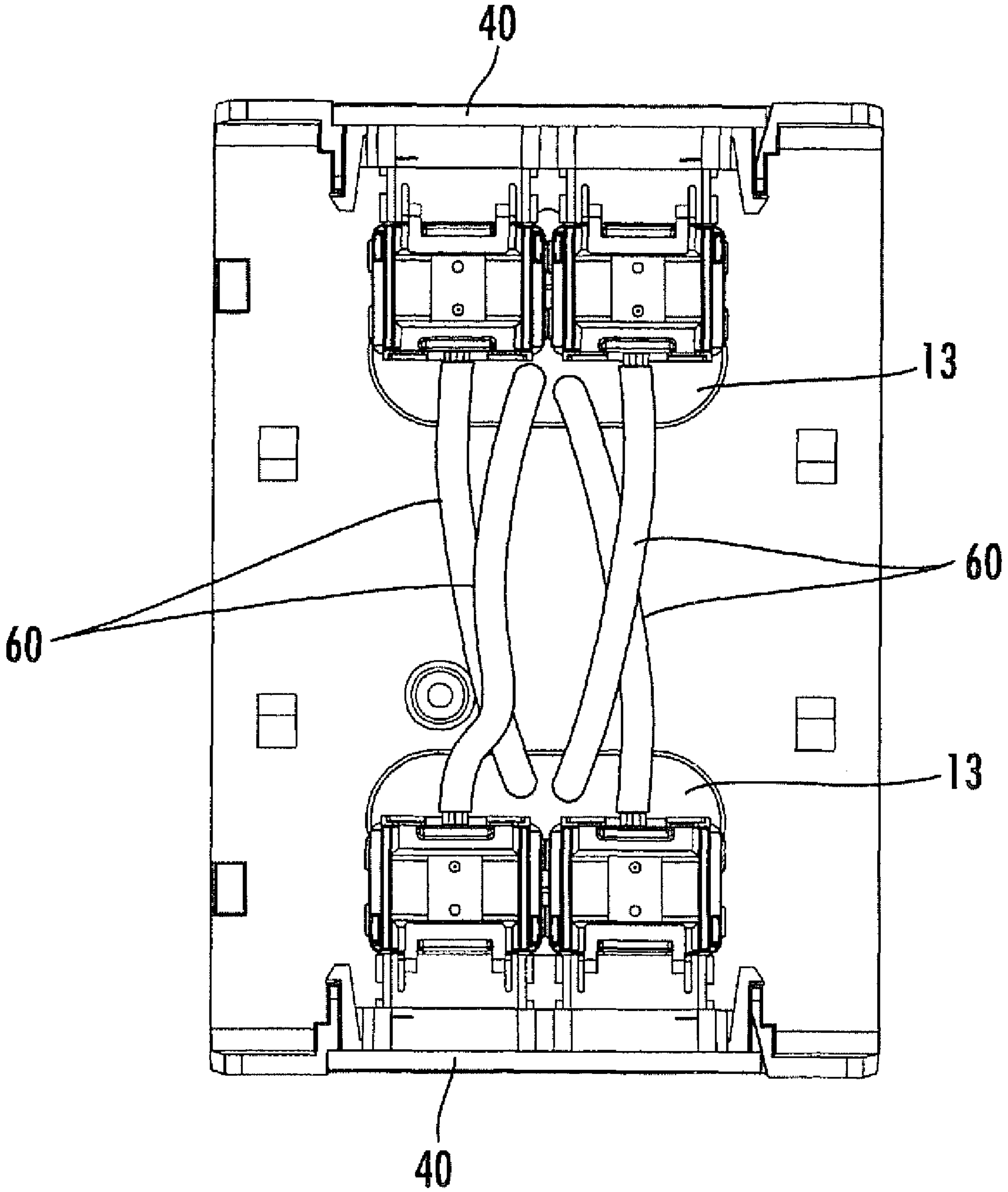
FIG. 7 is a top view of the surface mount box of FIG. 1 with communications cables entering the box through the cable entry apertures and connecting with adapters inserted into the adapter recesses.

The communications cables 60 can then be connected via connectors installed in the adapters provide ports for cables exiting the box 10 (FIG. 7). The cover 30 can then be installed onto the box 10 with a screw 31 inserted through the mounting aperture 37 and into the post 24. Optionally, a label 39 that includes information about the interconnections may be placed in the label recess 36.

Figure 9:
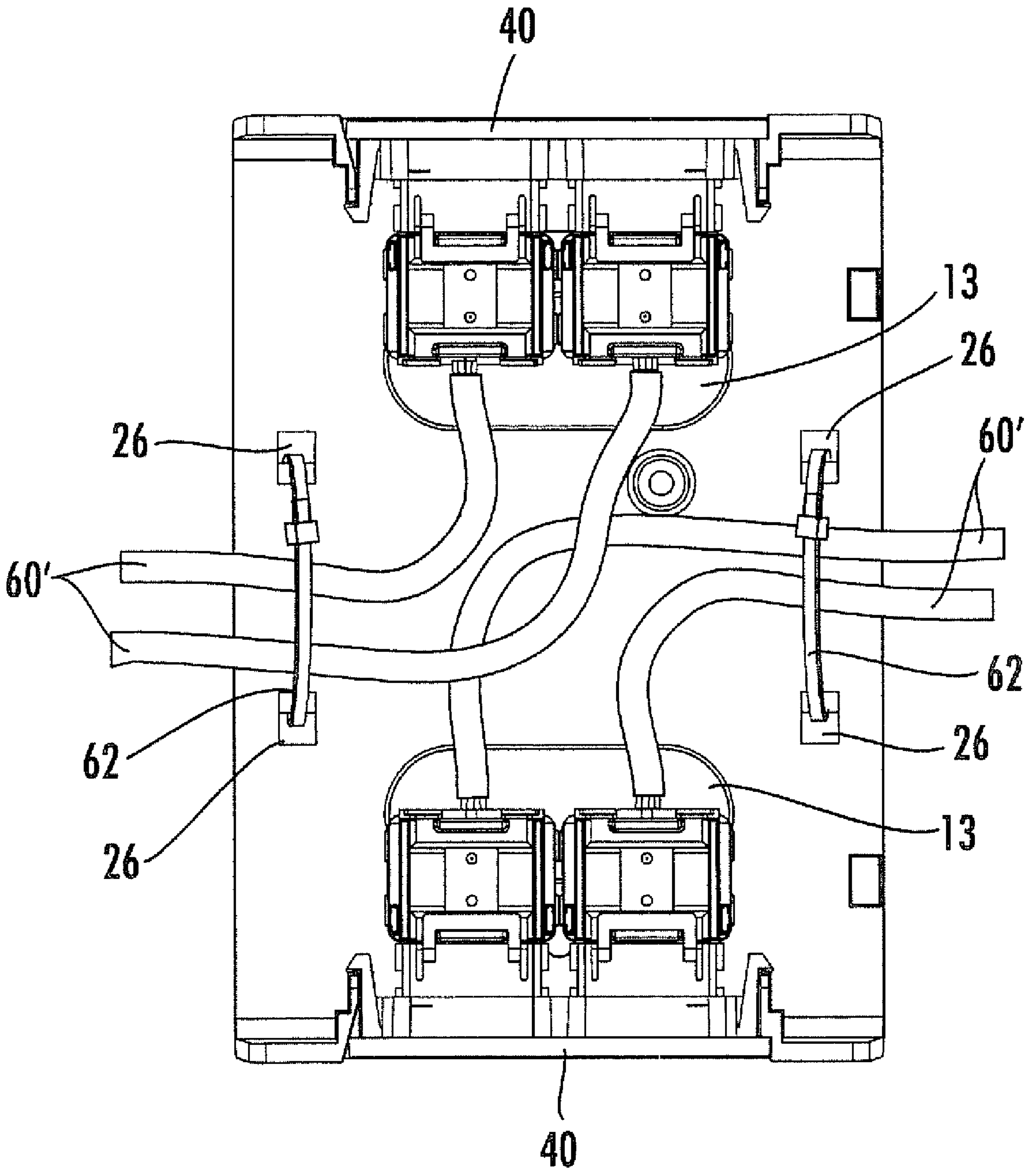
FIG. 9 is a top view of a surface mount box of FIG. 1 with side-entry communications cables.

As an alternative, communications cables 60' may enter from the sides of the box 10 rather than through the cable entry apertures 13 (see FIG. 9). In such instances, typically the frangible sections 38 of the cover 30 are removed into order to provide entry for the cables 60'. The cables 60' may be held in place with cable ties 62 inserted through holes 26.

Figure 10:
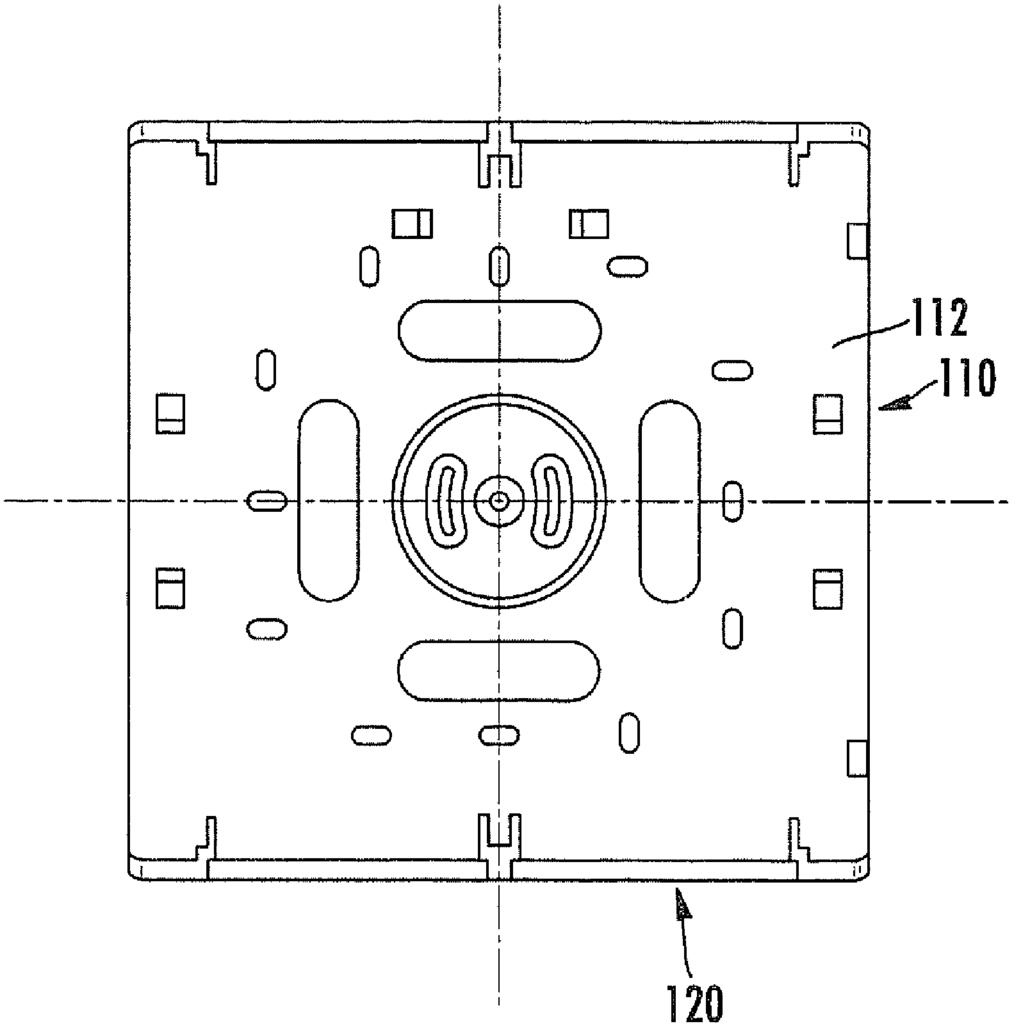
FIG. 10 is a top view of a surface mount box according to alternative embodiments of the present invention.
Figure 11:
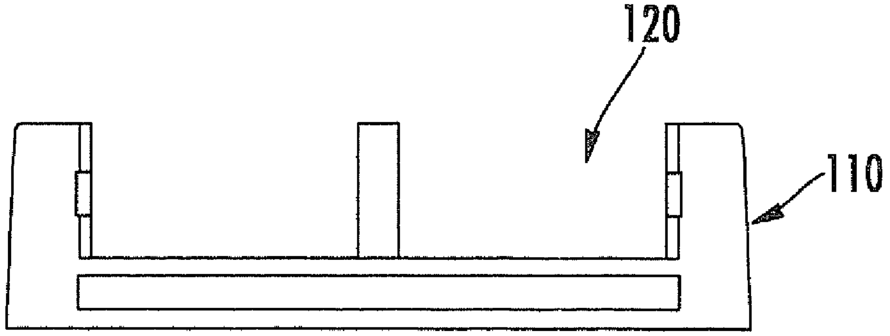
FIG. 11 is an end view of the surface mount box of FIG. 10.

Those skilled in this art will appreciate that the surface mount box of the present invention can be formed in different sizes. For example, a box 110 illustrated in FIGS. 10 and 11 has a wider main plate 112, with the result that the adapter recess 120 can receive two separate duplex connectors (i.e., the box 110 has four ports available on one end). Of course, either of the boxes 10, 110 can be formed with more or fewer ports as desired.

The foregoing is illustrative of the present invention and is not to be construed as limiting thereof. Although exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. The invention is defined by the following claims, with equivalents of the claims to be included therein.

That which is claimed is:

1. A plenum-rated surface mount box, comprising:

a base main panel;

a pair of base side walls attached to opposite ends of the base main panel;

wherein at least one of the base side walls includes an adapter recess that receives a telecommunications adapter, the adapter including at least one telecommunications connector; and wherein the base main panel and base side walls are formed as a unitary structure and comprise a polymeric material; and a cover comprising a cover main panel and a pair of opposing cover side walls formed as a unitary structure and comprising a polymeric material, each of the cover side walls being an apertureless panel;

wherein the cover main panel overlies the base main panel, and wherein each of the cover side walls spans the distance between the base side walls, such that the base main panel, the base side walls and the cover form a box-like structure, with the cover side walls meeting the base main panel and the base side walls meeting the cover main panel; and wherein nominal wall thicknesses and the polymeric materials of the main panel, the side walls, the cover main panel, and the cover side walls are selected such that the surface mount box satisfies the test requirements of UL 2043.

2. The surface mount box defined in claim 1, wherein the polymeric material is selected from the group consisting of: polyetherimide, polysulfone, fluoropolymers, vinyl polymers, and non-halogenated polymers.

3. The surface mount box defined in claim 1, wherein the base main panel and the base side walls have a nominal wall thickness of between about 0.062 and 0.125 inches.

4. The surface mount box defined in claim 1, wherein the adapter recess is sized and configured to receive a duplex adapter.

5. The surface mount box defined in claim 1, wherein the adapter recess is sized and configured to receive four adapter ports.

6. The surface mount box defined in claim 1, wherein the cover includes at least one frangible section.

7. The surface mount box defined in claim 1, wherein the base main panel includes a plurality of oblong apertures sized and configured to receive communications cables.

8. The surface mount box defined in claim 1, wherein the telecommunications adapter is configured to receive M-series outlets.

9. The surface mount box defined in claim 1, wherein the telecommunications adapter is configured to receive a coupler selected from the group consisting of: LC, ST and SC fiber couplers, VGA, S-Video, Coax, BNC and RCA couplers.

10. The surface mount box defined in claim 1, wherein the adapter recess is lined with at least one flange.

* * * * *